US007711394B2

(12) United States Patent
Lee

(10) Patent No.: US 7,711,394 B2
(45) Date of Patent: May 4, 2010

(54) DISPLAY INTERFACE OF MOBILE TELECOMMUNICATION TERMINAL

(75) Inventor: Sun Ho Lee, Seoul (KR)

(73) Assignee: LG Electronics Inc., Seoul (KR)

(*) Notice: Subject to any disclaimer, the term of this patent is extended or adjusted under 35 U.S.C. 154(b) by 0 days.

(21) Appl. No.: 11/110,347

(22) Filed: Apr. 19, 2005

(65) Prior Publication Data

US 2005/0233773 A1 Oct. 20, 2005

(30) Foreign Application Priority Data

Apr. 20, 2004 (KR) ..................... 10-2004-0027024

(51) Int. Cl.
*H04B 1/38* (2006.01)
*H04M 1/00* (2006.01)

(52) U.S. Cl. .................... 455/566; 455/550.1; 345/169; 345/520

(58) Field of Classification Search ................ 455/90.1, 455/566, 550.1; 345/102, 103, 97, 441, 3.1, 345/504, 520, 522, 169; 382/232
See application file for complete search history.

(56) References Cited

U.S. PATENT DOCUMENTS 5,790,652 A * 8/1998 Gulley et al. ................ 379/368
6,054,980 A * 4/2000 Eglit .......................... 345/204
6,073,034 A * 6/2000 Jacobsen et al. ............ 455/566
6,243,080 B1 * 6/2001 Molne ........................ 345/173
6,847,335 B1 * 1/2005 Chang et al. ................. 345/3.1
6,954,200 B2 * 10/2005 Kim ........................... 345/204
6,954,615 B2 * 10/2005 Sano ......................... 455/41.1
6,989,827 B2 * 1/2006 Myers ........................ 345/204
7,019,738 B2 * 3/2006 Tsutsui ....................... 345/211
7,136,685 B2 * 11/2006 Chiang .................... 455/575.3
7,146,051 B2 * 12/2006 Kang et al. ................. 382/232
2004/0183762 A1 * 9/2004 Kang et al. ................... 345/87
2004/0252891 A1 * 12/2004 Sasaki ........................ 382/232
2004/0257319 A1 * 12/2004 Park et al. ...................... 345/87
2005/0024339 A1 * 2/2005 Yamazaki et al. ........... 345/169
2005/0101343 A1 * 5/2005 Hsiao ...................... 455/550.1

FOREIGN PATENT DOCUMENTS

KR 10-20010100790 A 11/2001
KR 10-20030008358 A 1/2003
KR 10-20050100189 A 10/2005

* cited by examiner

*Primary Examiner*—George Eng
*Assistant Examiner*—Brandon J Miller
(74) *Attorney, Agent, or Firm*—Lee, Hong, Degerman, Kang & Waimey

(57) ABSTRACT

A display interface (interface device) of a mobile telecommunication terminal is provided. The mobile telecommunication terminal includes a main body having a processor, and a display coupled to the main body. The processor is configured to implement mobile telecommunication terminal functions. The interface device includes a digital-to-analog converter configured to convert digital pixel information to an analog color signal. The interface device also includes graphic signal lines operatively connected to the digital-to-analog converter, configured to carry the analog color signal to the display. The interfere device also includes a clock line operatively connected to the digital-to-analog converter, configured to provide a timing reference used to sample the analog color signal. The interface device also includes a data enable line operatively connected to the digital-to-analog converter, configured to control transmission of the analog color signal through the graphic signal lines based on a selective switching operation.

7 Claims, 5 Drawing Sheets

DISPLAY INTERFACE OF MOBILE TELECOMMUNICATION TERMINAL

CROSS-REFERENCE TO RELATED APPLICATIONS

Pursuant to 35 U.S.C.§119(a), this application claims the benefit of earlier filing date and right of priority to Korean Application No. 10-2004-0027024, filed on Apr. 20, 2004, the contents of which is hereby incorporated by reference herein in its entirety.

BACKGROUND OF THE INVENTION

1. Field of the Invention

The present invention relates generally to a mobile telecommunication terminal, and more particularly to a display interface of a mobile telecommunication terminal.

2. Discussion of the Related Art

FIG. 1 is a schematic view of a related art mobile telecommunication terminal. FIG. 2 is a schematic view of a related art liquid crystal display interface. FIG. 3 is a signal timing diagram according to the related art liquid crystal display interface.

Referring to FIG. 1, a folding type mobile telecommunication terminal 100 includes a main body 110 and a liquid crystal display (LCD) 120. Using a 16-bit bus, data is transmitted between the main body 110 and the LCD 120. Referring now to FIG. 2, the 16-bit bus includes a plurality of signal lines to control sixteen data lines used to transmit data. The control signals include a chip select (CS) signal, a write enable (WE) signal, an output enable (OE) signal, and an address (Add) signal. The CS signal is used to enable the LCD 120. The WE signal is used to write data from the main body 110 to the LCD 120. The OE signal is a read signal to read information from the main body 110. The Add signal is an address signal to select a color signal (i.e., red (R), green (G), and blue (B)) (color signal information). As described above, the 16-bit bus LCD interface requires twenty signal lines.

In the 16-bit bus, the color information (R, G, and B) in a pixel of an LCD is transmitted by n-bits in a digital form. Therefore, a data width of 3×n is required for the transmission. When the required data width exceeds 16 bits, the data is divided and transmitted by units of 16 bits. For example, when using an LCD screen displaying 256k colors, 6 bits for each color R, G, and B are allotted, thereby requiring a data width of 18 bits. The 18-bit packed data is divided into a 16-bit data packet and a 2-bit data packet, to be transmitted to the LCD through the bus using two cycles, as shown in FIG. 3.

Therefore, when a 16-bit bus is used, twenty signal lines, including a data signal and a control signal are required to transmit the data. In the folding type mobile telecommunication terminal, the LCD 120 is connected to the main body 110 by a hinge 130. The signal lines are connected to one another through a flexible printed circuit board (FPCB) 140. The width of the FPCB 140 is limited due to structural limitations of such a connection. Furthermore, folding type communication devices are frequently opened and closed, which applies structural stress to the FPCB 140.

In order to prevent a deficiency in the signal line from occurring, such as a break, the width of the signal line must be of at least some minimum width. In one such minimum pattern width, forty signal lines are used in the FPCB 140. The forty signal lines are used as signal lines between the main body 110 and the LCD 120, as well as to a receiver, a vibrating mechanism, a light emitting diode (LED), and a power source. Thus, additional signal lines are not available to perform other functions. Furthermore, by allotting a maximum number of signal lines into a limited width FPCB 140, the reliability of each signal line may be decreased.

In addition, as the functions of the recently introduced mobile telecommunication terminals are becoming more diverse, consumers need to open and close the hinge 130 more often. Consumers now also demand more sophisticated designs and structures for the hinge 130, such as those used in LCDs of camcorder type devices and slim type communication devices. Therefore, in order to satisfy these consumer demands, the width of the FPCB 140 needs to be reduced. However, since the 16-bit bus requires 20 signal lines, it is not possible to reduce the width of the FPCB 140.

SUMMARY OF THE INVENTION

The present invention is directed to a display interface of a mobile telecommunication terminal that addresses one or more problems of the related art.

An object of the present invention is to provide a display interface of a mobile telecommunication terminal that may reduce the number of signal lines used.

Another object of the present invention is to provide a display interface of a mobile telecommunication terminal that may implement additional functions by using the surplus signal lines.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, the display interface (interface device) is preferably located in a mobile telecommunication terminal that includes a main body having a processor, and a display coupled to the main body. The processor is configured to implement mobile telecommunication terminal functions. The interface device includes a digital-to-analog converter configured to convert digital pixel information to an analog color signal. The digital pixel information may preferably be stored in a video buffer in the main body. The interface device also includes graphic signal lines operatively connected to the digital-to-analog converter, configured to carry the analog color signal to the display. The interface device also includes a clock line operatively connected to the digital-to-analog converter, configured to provide a timing reference used to sample the analog color signal. The interface device also includes a data enable line operatively connected to the digital-to-analog converter, configured to control transmission of the analog color signal through the graphic signal lines based on a selective switching operation.

The interface device may preferably include an analog-to-digital converter operatively connected to the graphic signal lines, configured to convert the analog color signal into digital data. The graphic signal lines may preferably be connected via a flexible printed circuit board (FPCB). The analog color signal may preferably include red-green-blue (RGB) color information.

The display may preferably be a liquid crystal display (LCD). The mobile telecommunication terminal may preferably be a folding type mobile telecommunication terminal, such as for example, a "flip-phone".

In another embodiment, an interfacing method in a mobile telecommunication terminal having a main body and a display includes the steps of converting graphic data into an analog signal and transmitting the analog signal to the display. The graphic data may preferably be formed in the main body. The method also includes the steps of converting the analog signal to a digital signal, and storing the digital signal in a video buffer. The method may also preferably include the step of performing a switching operation to control the transmitting of the analog signal to the display. The step of performing a switching operation may preferably include transmitting a command signal. The step of performing a switching operation may also preferably include transmitting a data signal. The method may also include driving the display based on the digital signal stored in the video buffer.

As described above, in the display interface of a mobile telecommunication terminal, the number of signal lines may be reduced. Additionally, by maintaining FPCB width, the pattern width of each signal line may be increased to improve device reliability. Furthermore, surplus signal lines may be allotted to perform other device functions, thereby improving device functionality. Alternatively, the overall width of the FPCB may be reduced to accommodate sophisticated hinge designs and telecommunication terminal designs.

The present invention may be particularly suitable for transmitting and receiving data to and from the display using a flexible printed circuit board. The present invention uses an analog video signal to reduce the number of flexible printed circuit board signal lines, which may improve reliability. The display interface may also have a reduced signal line width between the main body and the display. Accordingly, the present invention may improve performance, functionality, and reliability in mobile telecommunication terminals.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principles of the invention.

DETAILED DESCRIPTION OF THE PREFERRED EMBODIMENTS

Reference will now be made in detail to the preferred embodiments of the present invention, examples of which are illustrated in the accompanying drawings. Wherever possible, the same reference numbers will be used throughout the drawings to refer to the same or like parts.

Figure 1:
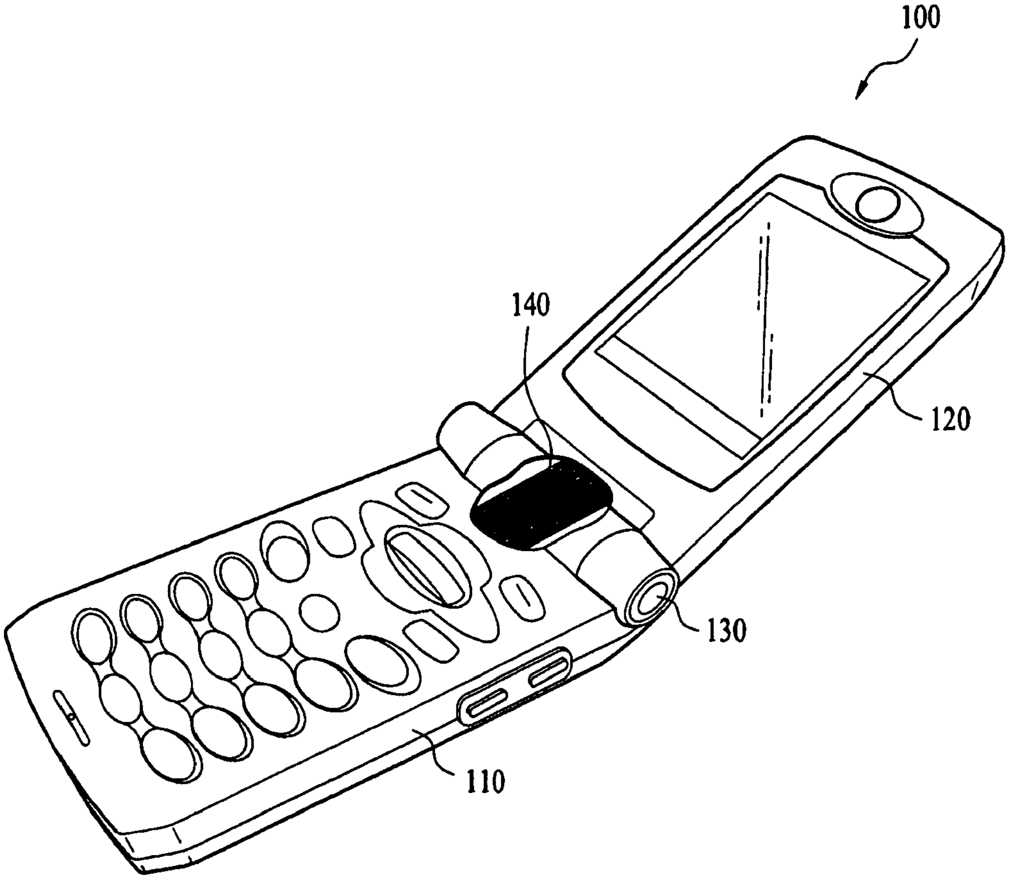
FIG. 1 is a schematic view of a related art mobile telecommunication terminal.
Figure 2:
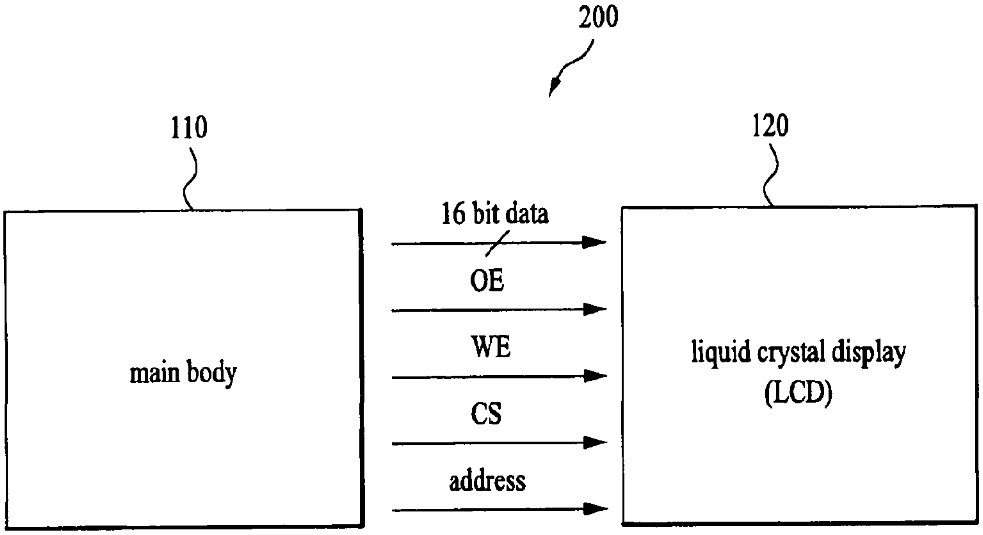
FIG. 2 is a schematic view of a related art display interface.
Figure 3:
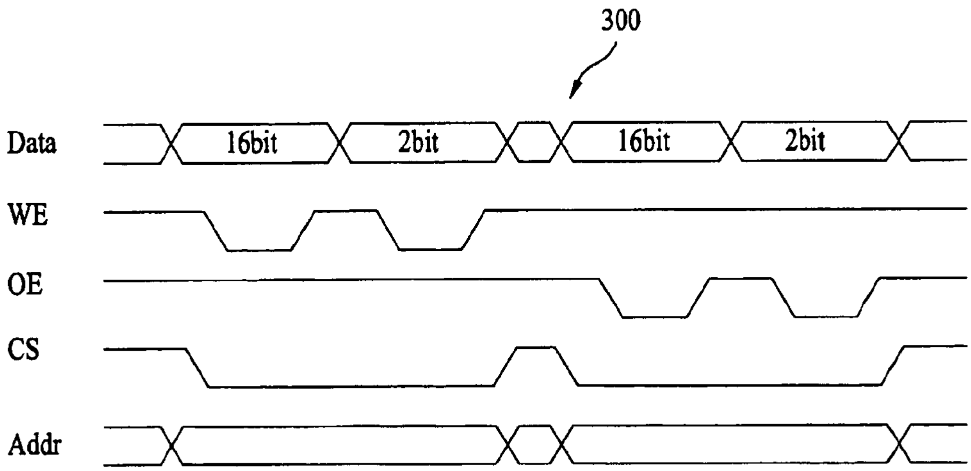
FIG. 3 is a signal timing diagram according to a related art display interface.
Figure 4:
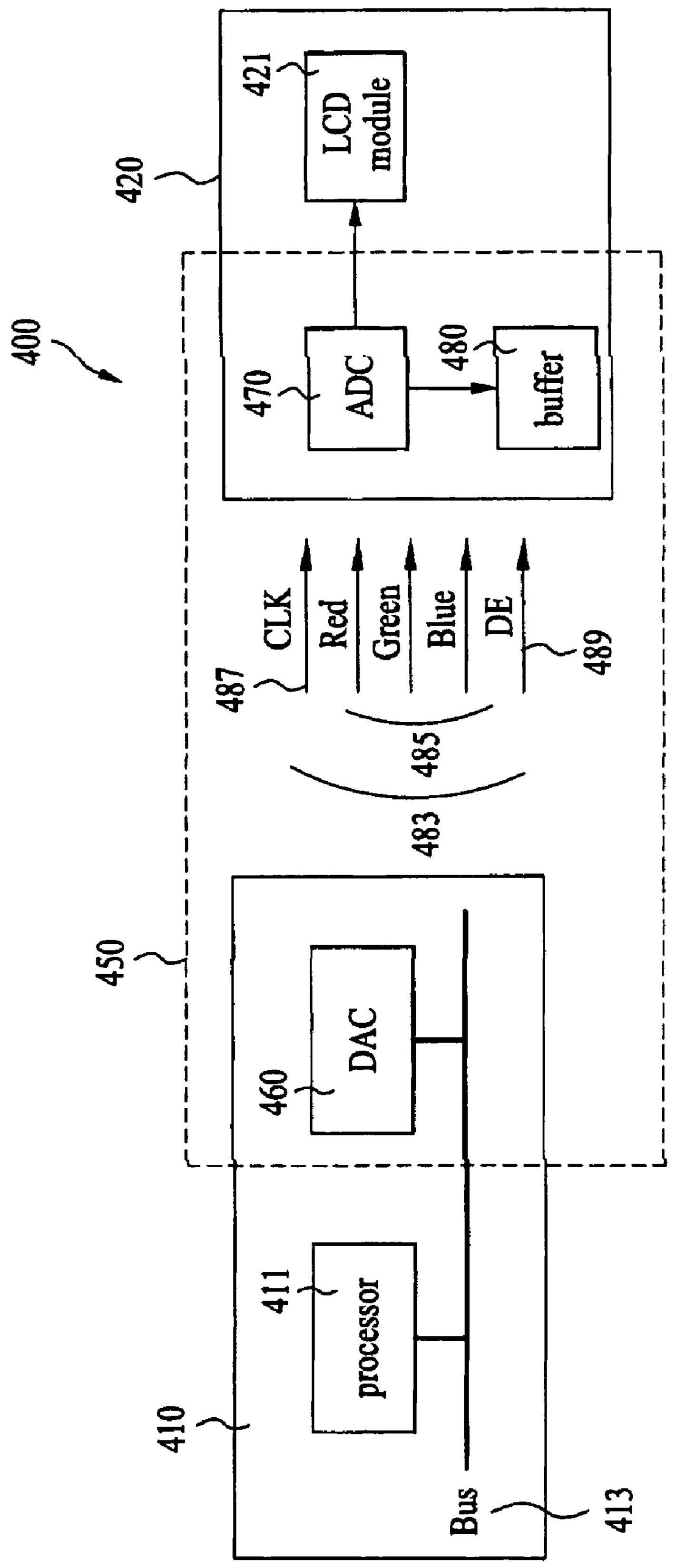
FIG. 4 is a schematic view of a display interface, according to one embodiment of the present invention.

FIG. 4 is a schematic view of a display interface 450 coupled to a processor 411 and a display screen 421, according to one embodiment of the present invention. The display screen 421 may be, for example, a liquid crystal display (LCD) screen or other type of display screen.

Referring to FIG. 4, the display interface 450 includes a digital-to-analog converter (DAC) 460, configured to convert graphic data into an analog signal (analog color signal). The display interface 450 also includes an analog-to-digital converter (ADC) 470 configured to convert the analog signal into graphic data. The display interface 450 also includes a video buffer 480 configured to store the graphic data. The DAC 460 is communicatively coupled to the ADC 470 via a plurality of graphic signal lines 485. The DAC 460 is also communicatively coupled to the ADC 470 via a clock line (CLK) 487 and a data enable line (DE) 489. Signal lines 483 include the graphic signal lines 485, the clock line 487 and the data enable line 489. In the embodiment depicted in FIG. 4, the DAC 460 and the processor 411 are located in a main body 410. The DAC 460 and the processor 411 are communicatively coupled by a data bus (bus) 413. In the embodiment depicted in FIG. 4, the ADC 470, the video buffer 480, and a display screen 421 are located in a display 420. Thus, the display (display part) 420 includes the display screen 421, as well as one or more other components.

Referring again to FIG. 4, the display interface 450 preferably includes five signal lines including graphic signal lines 485 (red (R), green (G), and blue (B)), configured to carry the analog signal used to drive pixels of the display 420. The clock line 487 may preferably perform sample timing. The data enable line 489 may preferably select data and command signals. The digital-to-analog converter 460 is configured to convert graphic data into analog signals using the processor 411 and the data bus 413. The analog-to-digital converter 470 is configured to convert the analog signals carried through the signal lines 483 into graphic data.

RGB color information (red (R), green (G), and blue (B)) used to drive a pixel of the display screen 421 is transmitted in an analog form (analog color signal). To this end, a command signal may be output to transmit the pixel information from the processor 411 to the video buffer 480. The command signal may be configured to convert the pixel information into an analog signal.

In another embodiment, the display interface (interface device) 450 is located in a mobile telecommunication terminal that includes the main body 410 having the processor 411, and the display 420 coupled to the main body 410. The processor 411 is configured to implement mobile telecommunication terminal functions. In the embodiment, the interface device 450 includes the digital-to-analog converter 460 configured to convert digital pixel information to an analog color signal. The digital pixel information may preferably be stored in a video buffer in the main body 410. The interface device 450 also includes the graphic signal lines 485 operatively connected to the digital-to-analog converter 460, configured to carry the analog color signal to the display 420. The interface device 450 also includes the clock line 487 operatively connected to the digital-to-analog converter 460, configured to provide a timing reference used to sample the analog color signal. The interface device 450 also includes the data enable line 489 operatively connected to the digital-to-analog converter 460, configured to control transmission of the analog color signal through the graphic signal lines 485 based on a selective switching operation.

The interface device may preferably include the analog-to-digital converter 470 operatively connected to the graphic signal lines 487, configured to convert the analog color signal into digital data. The graphic signal lines may preferably be connected via a flexible printed circuit board (FPCB). The analog color signal may preferably include red-green-blue (RGB) color information.

The display may preferably be a liquid crystal display (LCD). The mobile telecommunication terminal may preferably be a folding type mobile telecommunication terminal, such as for example, a “flip-phone”.

Figure 5:
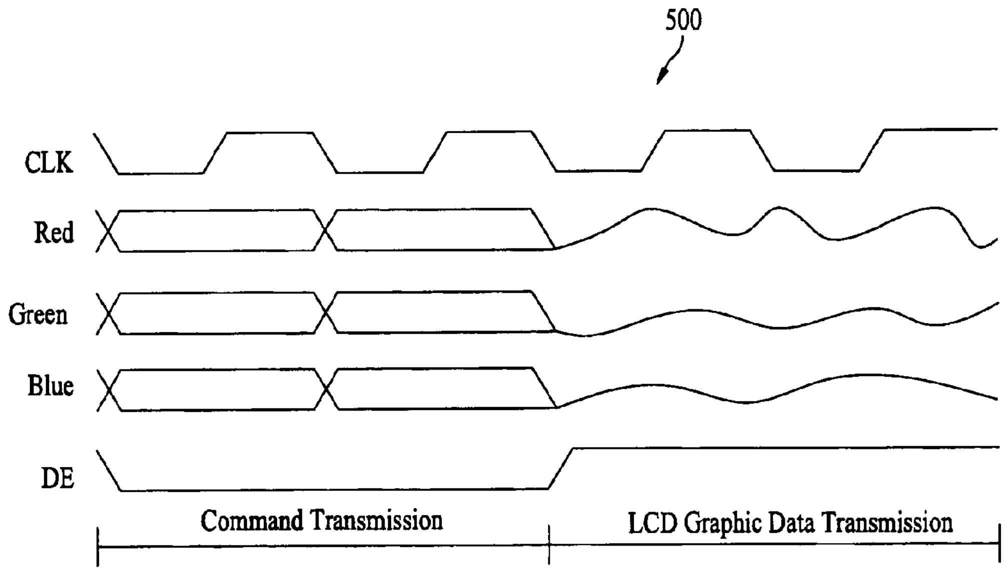
FIG. 5 is a signal timing diagram that corresponds to the display interface of FIG. 4, according to one embodiment of the present invention.

FIG. 5 is a signal timing diagram that corresponds to the display interface 450 of FIG. 4, according to one embodiment of the present invention.

Referring to FIG. 5, the analog signal may preferably be transmitted to the display 420 through each color (R, G, and B) of the graphic signal lines 485 on a flexible printed circuit board (FPCB). The transmitted analog signal may preferably be directly coupled to a display drive circuit. Alternatively, the transmitted analog signal may preferably be converted into a digital data by the ADC 470 to be stored in the video buffer 480. The clock 487 provides a timing reference used to sample the analog signal. The data enable signal 489, which represents the data, is preferably maintained at a high state. A command signal is preferably transmitted when the DE signal is maintained at a low state. The graphic data is preferably transmitted when the DE signal is at a high state.

When transmitting a command to the display 420, the DE signal 489 preferably identifies the command signal. The command signal is then transmitted in accordance with a corresponding protocol. Then, one or more of the red, green, and blue graphic signal lines 485 are used to transmit the analog color signal and corresponding data. If the command signal is transmitted in the same way as the analog color signal, the clock line 487 is preferably used to synchronize the signals.

In the embodiment depicted in FIG. 5, each of the graphic signal lines 485 is allocated to transmit graphic data (analog color signals). However, in order to insure a noise margin and/or to reduce quantization error of each analog color (R, G, and B) signal, the graphic signal line for each color (R, G, and B) may be heterogeneous.

Figure 6:
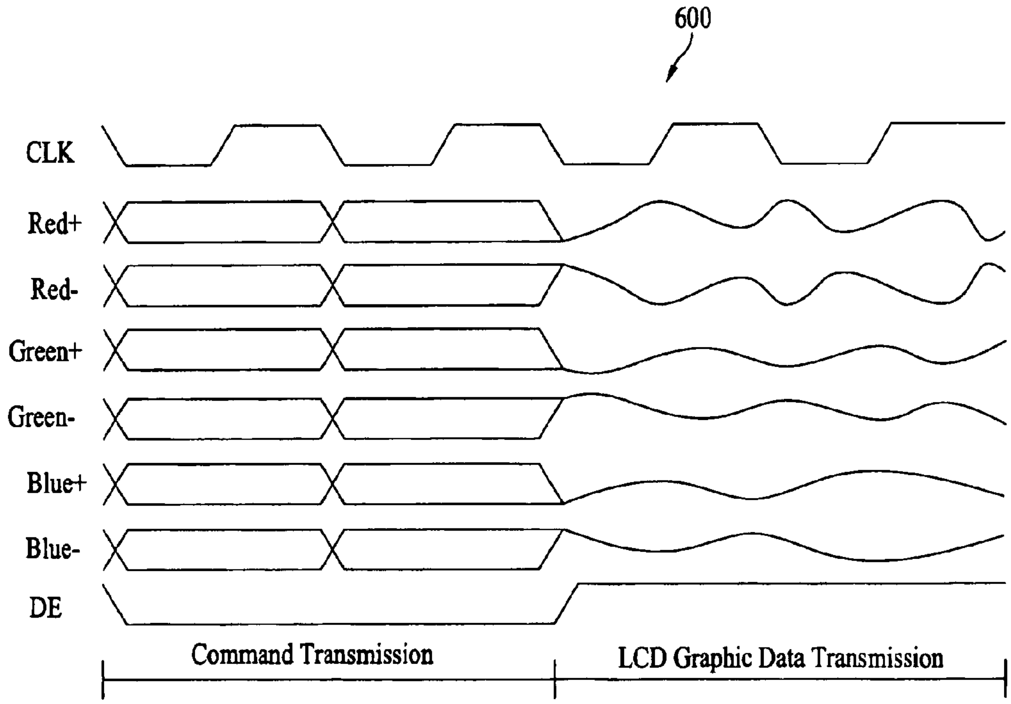
FIG. 6 is a signal timing diagram that corresponds to the display interface of FIG. 4, according to another embodiment of the present invention.

FIG. 6 is a signal timing diagram that corresponds to the display interface 450 of FIG. 4, where the graphic signal lines 485 are heterogeneous, according to another embodiment of the present invention.

Referring to FIG. 6, display interface 450 includes eight signal lines. The eight signal lines may preferably include Red+, Red−, Green+, Green−, Blue+, and Blue− signal lines, the clock line 487, and the data enable line 489.

Figure 7:
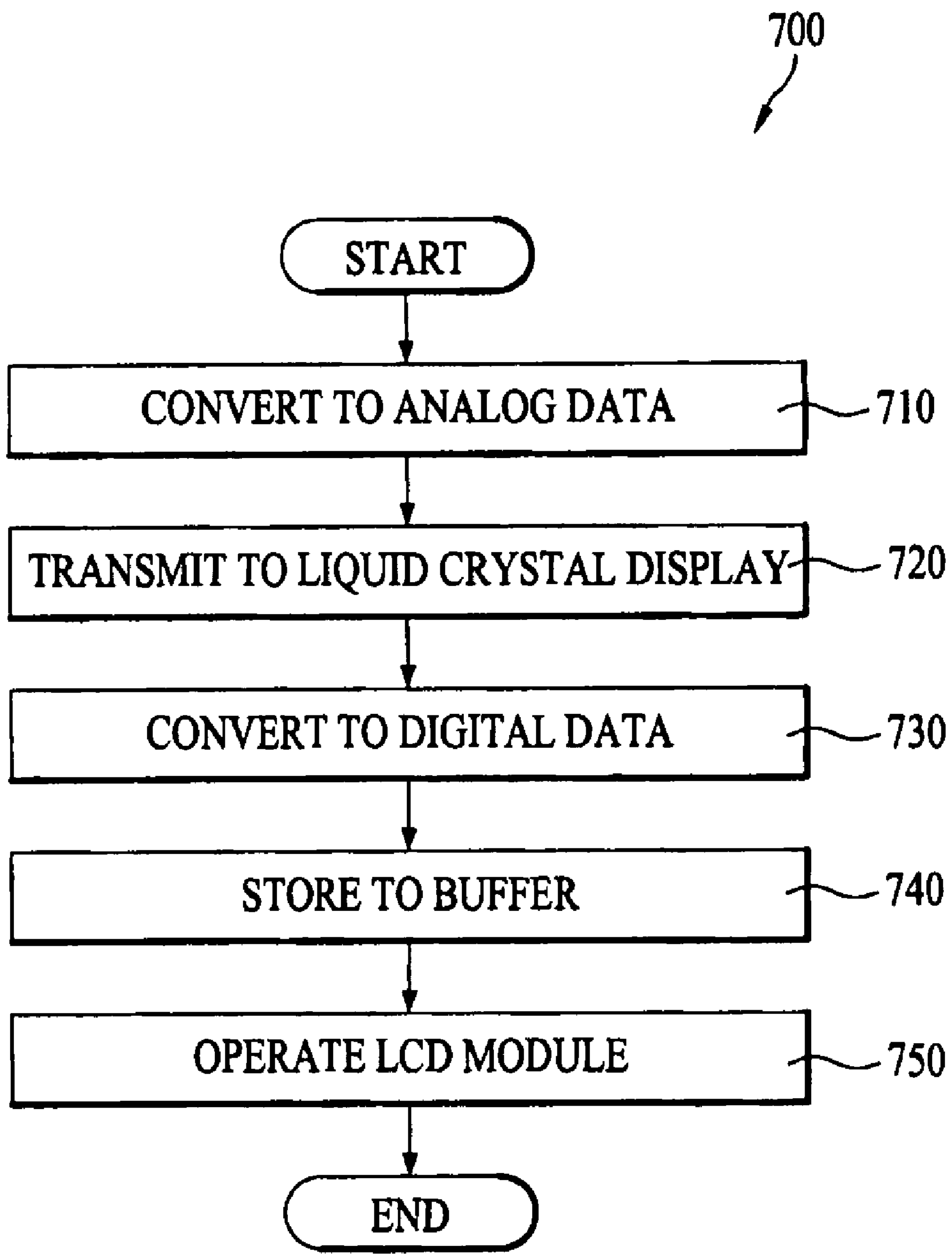
FIG. 7 is a flow diagram illustrating a method for interfacing a display of a mobile telecommunication terminal, according to one embodiment of the present invention.

FIG. 7 is a flow diagram illustrating a method for interfacing a display of a mobile telecommunication terminal, according to one embodiment of the present invention.

Referring to FIG. 7, at step 710, a digital-to-analog converter converts graphic data into analog signals (analog color signals) in accordance with a command signal provided by a processor within a main body. The graphic data converted into analog signals may preferably be transmitted to the display through a flexible printed circuit board (FPCB). At step 720, a clock line provides a sampling timing, and a data enable signal is changed to a high state to enable transmission of the data. At step 730, the graphic data converted into analog signals is converted into digital signals using an analog-to-digital converter (ADC). At step 740, the digital signals are stored to a video buffer. Alternatively, the graphic data converted into analog signals is directly transmitted to a display screen. At step 750, the display screen is driven according to the color information (digital signals) stored in the video buffer.

In another embodiment, an interfacing method in a mobile telecommunication terminal having a main body and a display includes the steps of converting graphic data into an analog signal and transmitting the analog signal to the display. The graphic data may preferably be formed in the main body. The method also includes the steps of converting the analog signal to a digital signal, and storing the digital signal in a video buffer. The method may also preferably include the step of performing a switching operation to control the transmitting of the analog signal to the display. The step of performing a switching operation may preferably include transmitting a command signal. The step of performing a switching operation may also preferably include transmitting a data signal. The method may also include driving the display based on the digital signal stored in the video buffer.

As described above, in the display interface of a mobile telecommunication terminal, the number of signal lines may be reduced. Additionally, by maintaining FPCB width, the pattern width of each signal line may be increased to improve device reliability. Furthermore, surplus signal lines may be allotted to perform other device functions, thereby improving device functionality. Alternatively, the overall width of the FPCB may be reduced to accommodate sophisticated hinge designs and telecommunication terminal designs.

The present invention may be particularly suitable for transmitting and receiving data to and from the display using a flexible printed circuit board. The present invention uses an analog video signal to reduce the number of flexible printed circuit board signal lines, which may improve reliability. The display interface may also have a reduced signal line width between the main body and the display. Accordingly, the present invention may improve performance, functionality, and reliability in mobile telecommunication terminals.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A mobile telecommunication terminal having a main body, the mobile telecommunication terminal comprising:

a processor disposed in the main body configured to perform operations of the mobile telecommunication terminal; a digital display coupled to the main body configured to display information; and an interface device configured to transmit signals to the digital display, wherein the interface device comprises: a data bus coupled to the processor, the data bus comprising graphic signal lines, a data enable line, and a clock line, a digital-to-analog converter for converting digital pixel information to an analog color signal, wherein the digital-to-analog converter is operatively connected to the data bus, and an analog-to-digital converter for converting the analog color signal to digital pixel information, wherein the analog-to-digital converter is operatively connected to the data bus, wherein the digital-to-analog converter is located in the main body and the analog-to-digital converter is located in the display, and wherein the graphical signal lines transmit a command signal from the processor or the analog color signal from the digital-to-analog converter according to a state of the data enable line, such that the command signal is transmitted to the analog-to-digital converter when the data enable line is maintained at a first state and the analog color signal is transmitted to the digital display when the data enable line is at a second state.

2. The mobile telecommunication terminal according to claim 1, wherein the digital display is a liquid crystal display (LCD).

3. The mobile telecommunication terminal according to claim 1, wherein the mobile telecommunication terminal is a folding type mobile telecommunication terminal.

4. The mobile telecommunication terminal according to claim 1, wherein the analog color signal comprises red-green-blue (RGB) color information.

5. The mobile telecommunication terminal according to claim 4, wherein the graphic signal lines are heterogeneous.

6. The mobile telecommunication terminal according to claim 5, wherein the graphic signal lines comprise Red+, Red−, Green+, Green−, Blue+, and Blue−.

7. An interfacing method in a folding type mobile telecommunication terminal comprising a main body and a liquid crystal display, the method comprising:

generating digital graphic data in the main body converting the digital graphic data into an analog signal at a digital-to-analog converter located in the main body; determining whether to transmit a command signal or the converted analog signal to the liquid crystal display according to a data enable signal; transmitting the command signal or the converted analog color signal via graphic signal lines from the main body according to the data enable signal, such that the command signal is transmitted to an analog-to digital converter when the data enable signal is maintained at a first state and the converted analog signal is transmitted to the liquid crystal display when the data enable signal is at a second state, and wherein the analog-to-digital converter is located in the liquid crystal display for converting the converted analog signal to a digital signal to be stored in a video buffer at the liquid crystal display; and driving the liquid crystal display according to the digital signal stored in the video buffer or the received converted analog signal.

* * * * *